(12) United States Patent
Downey

(10) Patent No.: US 8,151,876 B2
(45) Date of Patent: Apr. 10, 2012

(54) WELL STIMULATION

(75) Inventor: Robert A. Downey, Centennial, CO (US)

(73) Assignee: Ciris Energy, Inc., Centennial, CO (US)

( * ) Notice: Subject to any disclaimer, the term of this patent is extended or adjusted under 35 U.S.C. 154(b) by 147 days.

(21) Appl. No.: 12/462,682

(22) Filed: Aug. 7, 2009

(65) Prior Publication Data

US 2010/0032157 A1 Feb. 11, 2010

Related U.S. Application Data

(60) Provisional application No. 61/188,398, filed on Aug. 8, 2008.

(51) Int. Cl.
*E21B 43/22* (2006.01)
*E21B 43/24* (2006.01)
*E21B 43/25* (2006.01)
*E21B 43/26* (2006.01)

(52) U.S. Cl. ............ 166/249; 166/263; 166/272.6; 166/272.7; 166/280.1; 166/300; 166/303; 166/305.1; 166/308.1; 166/308.2; 507/238; 507/254; 507/258

(58) Field of Classification Search ............ 507/238, 507/254, 258; 166/50, 249, 263, 272.6, 272.7, 166/275, 280.1, 300, 303, 305.1, 308.1, 308.2
See application file for complete search history.

(56) References Cited

U.S. PATENT DOCUMENTS

| | | | | | |
|---|---|---|---|---|---|
| 3,480,083 | A | * | 11/1969 | Oleen | 166/268 |
| 3,703,928 | A | * | 11/1972 | Fulford | 166/275 |
| 3,704,751 | A | * | 12/1972 | Tate | 166/307 |
| 3,719,229 | A | * | 3/1973 | Tate | 166/271 |
| 4,393,935 | A | * | 7/1983 | Walton | 166/270.1 |
| 4,511,480 | A | * | 4/1985 | Outlaw et al. | 507/238 |
| 4,813,482 | A | * | 3/1989 | Walton | 166/267 |
| 4,886,609 | A | * | 12/1989 | Walton | 507/238 |
| 4,913,237 | A | * | 4/1990 | Kutas | 166/308.1 |
| 4,993,491 | A | * | 2/1991 | Palmer et al. | 166/280.1 |
| 5,390,741 | A | * | 2/1995 | Payton et al. | 166/284 |
| 5,462,116 | A | * | 10/1995 | Carroll | 166/249 |
| 5,514,645 | A | * | 5/1996 | McCabe et al. | 507/238 |
| 6,915,854 | B2 | * | 7/2005 | England et al. | 166/300 |
| 7,475,730 | B2 | * | 1/2009 | Brown et al. | 166/309 |
| 2010/0139913 | A1 | * | 6/2010 | Downey | 166/246 |

* cited by examiner

*Primary Examiner* — George Suchfield
(74) *Attorney, Agent, or Firm* — Carella, Byne, et al.; Elliot M. Olstein

(57) ABSTRACT

Disclosed are processes for improving recovery of product from a subterranean carbonaceous deposit wherein there has been a reduction in product recovery from a production well, the processes comprising treating the deposit with a liquid that contains at least one of an oxoacid ester of phosphorous or an oxoacid acid ester of sulfur.

20 Claims, No Drawings

WELL STIMULATION

This application claims the priority of U.S. Provisional Application Ser. No. 61/188,398, filed Aug. 8, 2008, the disclosures of which are hereby incorporated by reference in their entireties.

The present invention relates to improving recovery of products from a carbonaceous deposit through a producing well. More particularly, the invention is directed to improving recovery of gaseous product from a carbonaceous deposit; in particular coal.

DESCRIPTION OF RELATED ART

At year end 2006, there were approximately 50,000 wells producing natural gas from coalseams in the United States and Canada. Coalbed methane natural gas reserves then totaled about 20 Trillion cubic feet, and production was about 1.8 Trillion cubic feet per year, amounting to about 8% of total US reserves and production. Coalbed methane gas wells vary greatly in terms of depth, well configuration, and the type or rank of coal under production.

In most cases, coalbed methane gas wells are completed with only minor well stimulation treatments, i.e., methods designed to improve hydraulic connectivity between the wellbore and the coalseam formation. Fracture stimulation treatments are not as effective in increasing production and reserves recoveries in coalseam gas wells as they are in sandstone, limestone or shale gas wells, because of the physical properties of coal. Coal is much more compressible than other rocks, such as sandstones and shales, and is composed primarily of carbon.

Most of the porosity, or the fluid and/or gas-filled space in coal, is in naturally occurring fractures or micro-fractures, also known as cleats. As a result, hydraulic fracture stimulation treatments usually cannot propagate long, propped fractures in coal, and therefore the effectiveness of these stimulation treatments is limited. Recovery of methane from coalseams depends on the extent of formation pressure reduction, as nearly all of the natural gas contained in the coalseam is adsorbed, and must desorb from within the coal matrix, diffuse through the coal into microfractures and then flow into fractures to the wellbore of a production well. Desorption is non-linear with pressure, and in many coalseams the majority of the methane content is adsorbed at the lower portion of the pressure profile.

Over time, gas recovery is reduced and there is a need to stimulate the well in order to improve product recovery.

DESCRIPTION OF THE INVENTION

In accordance with the present invention, there is provided a process for improving recovery of product from a subterranean carbonaceous deposit wherein prior to treatment in accordance with the invention there has been a reduction in product recovery.

In one embodiment of the invention, product production is stimulated by treating the well and/or deposit associated with the well with a liquid that contains at least one oxoacid ester of phosphorous or at least one thioacid ester of phosphorous.

Although applicant does not intend to be bound thereby, it is believed that the reduction results from carbonaceous particles and/or fines that flow toward the wellbore, plugging up fractures and microfractures and greatly reducing or even stopping the inflow of gas and water into the wellbore, which reduces fluid flow through openings (cleats) and/or fractures in the deposit and/or associated well equipment and that treatment with the liquid reduces the amount of such fines and/or particles to thereby increase fluid flow and increase production from such well. In effect the liquid treatment "unplugs" the flow passages and/or well equipment, whereby products may flow from the deposit and be recovered through the production well.

In one embodiment, the carbonaceous deposit may be shale or coal.

The treating maybe accomplished by introducing the treating agent directly into the production well as to which product production has been reduced. The liquid is introduced under a pressure that will cause the liquid to flow into the deposit associated with the production well. As an alternative, such treating liquid may be introduced into the deposit through a different well under a pressure that causes the treating liquid to flow through the deposit into the production well.

In one embodiment where the treating liquid is introduced into a production well, during treating, in effect, instead of pumping fluid out of the production well, treating fluid is pumped into the production well and associated carbonaceous deposit. The treating is effected for a period of time that will increase recovery of product from the production well. After the treatment is completed, normal production is resumed whereby fluid is pumped out of the well in order to recover product from the production well.

As hereinabove indicated, the reduction in product recovery results from fines and/or particles of the carbonaceous material blocking passages in the carbonaceous deposit and/or the wellbore and associated equipment through which product flows for recovery through the production well. The use of treating liquid as hereinabove described improves production by unblocking such passages and/or equipment thereby improving flow of product into and through the production well.

The hereinabove-noted and hereinbelow-noted "liquid containing at least one of an oxoacid ester of phosphorus or a thioacid ester of phosphorus" may be produced in solution from the appropriate oxoacid or thioacid and the appropriate alcohol. Where referred to throughout this disclosure a "liquid containing at least one of an oxoacid ester of phosphorus or a thioacid ester of phosphorus" shall mean either "a liquid containing at least one of an oxoacid ester of phosphorus or a thioacid ester of phosphorus" and/or a liquid comprising the appropriate oxoacid or thioacid and the appropriate alcohol.

The treating step is carried out at temperatures prevailing in the subterranean carbonaceous deposit.

In some embodiments the solution and/or other amendments may be preheated.

The treating step may be carried out at a variety of pHs. In one embodiment, the pH is acidic. In another embodiment the pH may be neutral or basic. The treating step may be carried out at any pressure ranging from a vacuum to greater than 5,000 psig.

The oxoacid ester of phosphorus may be an ester of phosphorous acid, phosphoric acid, hypophosphorous acid, polyphosphoric acid, or mixtures thereof.

Suitable alcohols include methanol, ethanol, ethylene glycol, propylene glycol, glycerol, pentaerythritol, trimethylol ethane, trimethylol propane, trimethylol alkane, alkanol, polyol, or mixtures thereof.

In one embodiment the treating liquid includes a di-ester of an acid of phosphorous. For example, such an ester may be a diester of phosphorous acid. In another embodiment, the treating liquid includes a mono-ester and a diester of an oxoacid of phosphorous.

In producing the ester in situ from the acid and alcohol, the blend may have any ratio of the oxoacid of phosphorus to the alcohol. Preferably, the ratio of the oxoacid of phosphorus to the alcohol is from 10:1 to 1:10.

In producing the ester in situ from the acid and alcohol, the blend may have any ratio of the thioacid of phosphorus to the alcohol. Preferably, the ratio of the thioacid of phosphorus to the alcohol is from 10:1 to 1:10.

In one embodiment, the treating is performed with a water solution of the oxoacid ester. The method of the present invention can include regulating the water content of the blend before or during treating. Regulation of the water content can be carried out by removing water. Suitable techniques for doing so include molecular sieving, distillation, or adding a dehydrating agent to the blend.

The method of the present invention may also include sonicating the blend during or after the treating.

It is well known that hydrolysis equilibria are reversible for many chemicals. Phosphite esters are no exceptions (see Scheme 1 for an example). Thus, this process can proceed from left to right in each equilibrium step starting with $P(OEt)_3$ and water, or from right to left starting from phosphorous acid and ethanol at the lower right of the Scheme. Starting with 3 equivalents of EtOH and an equivalent of phosphorous acid and then removing the water (e.g., with molecular sieves) produces mainly $P(OEt)_3$.

TABLE 1

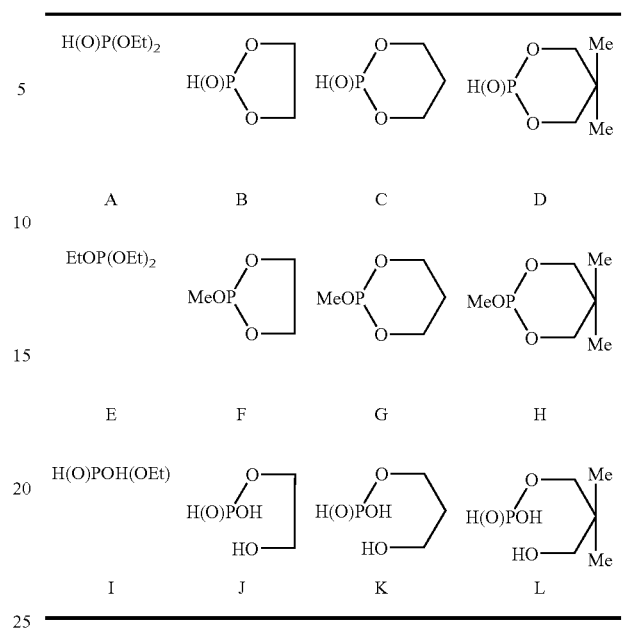

In Schemes 2, 3, and 4 (below), the polyols from which N, R, and V in these schemes are made are glycerol, trimethylol propane, and pentaerythritol, respectively (see Table 1, above). These polyols are very cheap and are made in large volumes (i.e., glycerol is an overly abundant byproduct of the Scheme 1

$P(OEt)_3$ ⇌[HOH/EtOH] $H(O)P(OEt)_2$ ⇌[HOH/EtOH] $H(O)P(OH)(OEt)$ ⇌[HOH] $H(O)P(OH)_2$ + EtOH

Parent Phosphite     First Hydrol. Prod.     Second Hydrol. Prod.     Final Hydrol. Products It is possible to start with phosphorous acid and the required alcohol to make a mixture of the first hydrolysis product and the second hydrolysis product for use as the active pretreatment medium or to start with the first hydrolysis product, and by adding the correct amount of water, make the same mixture as starting with phosphorous acid and the required alcohol.

It is generally possible to proceed in either direction of an equilibrium or sequence of equilibria. This process is governed by Le Chatelier's Principle.

The alcohols (see Table 1, below) from which A, (ethanol), B (ethylene glycol), C (propylene glycol), and D (2,2-dimethylpropylene-1,3-diol) are made are commercially inexpensive, are manufactured in large volumes, and are of very considerable industrial importance.

biodiesel industry, trimethylol propane is used in polyurethane manufacture, and pentaerythritol is made in over 100 million pound quantities per year, most of which is used in alkyd resins and lubricants). Although the parent bicyclic phosphite M in Scheme 2 is known, it would not form in the proposed reaction of glycerol and phosphorous acid, because of its strained bonds and the fact that its formation would require the presence of a catalyst. A catalyst is also required for the analogous formations of the toxic parent phosphite Q in Scheme 3 and the non-toxic parent phosphite U shown in Scheme 4. It should be noted that neither first nor second hydrolysis products for the phosphite esters in Schemes 2-4 are commercially available, nor are there reports of their isolation to date.

Scheme 2

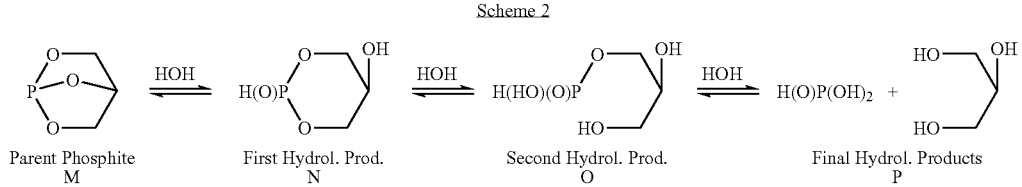

Parent Phosphite M     First Hydrol. Prod. N     Second Hydrol. Prod. O     Final Hydrol. Products P Scheme 3

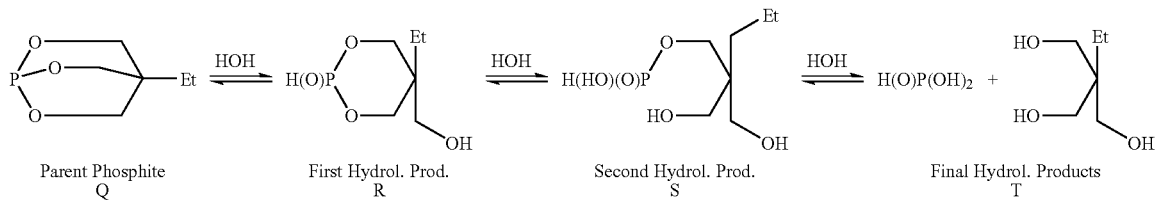

| Parent Phosphite | First Hydrol. Prod. | Second Hydrol. Prod. | Final Hydrol. Products |
| Q | R | S | T |

Scheme 4

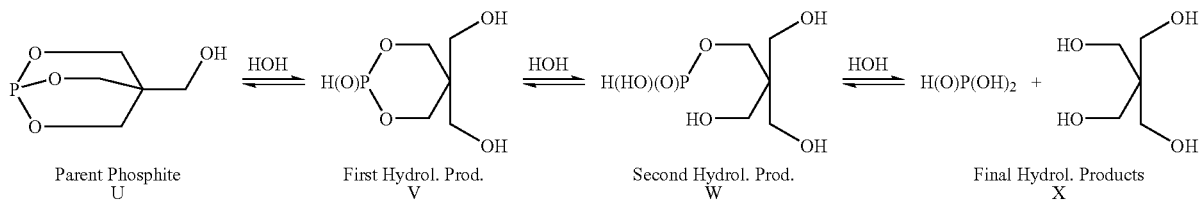

| Parent Phosphite | First Hydrol. Prod. | Second Hydrol. Prod. | Final Hydrol. Products |
| U | V | W | X |

Synthesis of parent phosphite esters for subsequent hydrolysis (to make the desired ratio of first to second hydrolysis products) requires expense, time, and energy, which can be avoided by starting with phosphorous acid and the desired alcohol, diol, triol, or tetraol, followed by removing the appropriate amount of water. The mixture of active agents is created by proceeding from the final hydrolysis products and working toward parent phosphites but not actually synthesizing them.

The first hydrolysis products A-D of the parent phosphites E-H, respectively, are effective agents for coal. Compounds A, B, and D are commercially available, but C can be synthesized. It should be noted that A-D by themselves are also effective in the presence of some water to make a mixture of first and second hydrolysis products I-L.

One skilled in the art would recognize that thiophosphoryl compounds, those bearing the P=S functionality, may be substituted for related phosphoryl derivatives. Such substitution of a sulfur for one or more oxygens in a phosphorous oxoacid, an oxoacid ester, a phosphoric oxoacid, or a phosphoric acid ester would be possible as thiophosphorous and thiophosphoric compounds are well known. However, such sulfur containing compounds could be more expensive and pose environmental problems.

Embodiments and methods of the invention include methods and processes in which the treating agent is introduced via injection at pressures and/or rates sufficiently high to open and/or propagate fractures in the subterranean formation at and away from the wellbore.

Embodiments and methods of the invention include methods and processes in which the treating agent is introduced via injection in sufficient volumes so as to cause a significant removal of solid carbonaceous material along the fractures and microfractures of the formation and provide an increase in the effective permeability of said formation to gas and water flow.

Embodiments and methods of the invention include methods and processes in which the treating agent is introduced, along with certain other chemicals that may reduce surface tension, prevent precipitation of solids, promote desorption of methane from the carbonaceous matrix, and reduce friction pressure drop within the formation and into the wellbore.

Embodiments and methods of the invention include methods and processes in which the treating agent is introduced along with the injection, prior to the injection, or after the injection of gases such as nitrogen, oxygen or carbon dioxide, in a liquid-continuous state, (such as aerated liquid or foam,) or gas continuous state (such as a mist) in order to prevent precipitation of solid, and to promote the recovery of the injected fluids, the solubilized materials and the production of gas and water from the formation.

Embodiments and methods of the invention include methods and processes in which the treating agent is introduced with certain other chemicals that may reduce surface tension, prevent precipitation of solids, promote desorption of methane from the carbonaceous matrix, and reduce friction pressure drop within the formation and into the wellbore and/or with gases such as nitrogen, oxygen or carbon dioxide, in order to prevent precipitation of solids, promote the recovery of injected fluids, the solubilized materials and the production of water and gas, into carbon-bearing subterranean formations. Such introduction of the treating agent alone or in conjunction with other agents may be made via vertical, horizontal, or angled wellbores, including wellbores having one or more penetrations or entries, or accessing one or more individual deposits, such as a coal seam.

Embodiments and methods of the invention include methods and processes in which the treating agent is introduced with certain other chemicals and/or gases, in conjunction with, prior to, or after the application of sonic waves that may be induced, generated or propagated into the carbon-bearing subterranean formation.

Embodiments and methods of the invention include methods and processes in which the treating agent is introduced with certain other chemicals and/or gases, with the addition of heat and/or the heating of said chemical compounds, and/or certain other chemicals and/or gases.

During or following injection of the treating agent, a device capable of generating sound waves may be placed into the well, or if placed into the well prior to the chemical injection the device may be activated, to generate sound waves that may increase or improve the chemical reaction of the injected chemicals on the coal.

Following introduction of the treating agent, conventional hydraulic fracturing fluids and proppants may be injected into the coalseam via the well, in order to further stimulate the flow of methane and water from the well.

The well may be shut in for a period of time to allow the mixture to fully react with or solubilize the carbonaceous particles; such as coal that reduce recovery of product from the well; e.g., the well shut in time may range from minutes to days, depending upon a number of factors. Following the shut-in period and/or the period of sonication, the well is opened and gas and water are produced.

The composition of the additional materials to be utilized may vary significantly, depending upon the composition, rank or other properties of the deposit to be stimulated or treated. The composition may include water and/or diluents to improve handling characteristics, and may also include foam-producing surfactants.

The process may be carried out using injection pressures that may or may not exceed the fracturing pressure of the deposit, such as a coalseam, depending upon the desired result. Injection at pressures below the fracturing pressure of the coalseam may enable the chemicals to more readily solubilize coal fines and coal surfaces in the areas nearer to the wellbore, while injection at pressures above the fracturing pressure of the deposit such as a coalseam will tend to displace the injected chemicals farther into the deposit and into newly-created fractures and microfractures, away from the wellbore.

A propping agent, such as sand or another spherical solid material of similar size range, may be added to the treating agent. The propping agent may serve to "prop" induced fractures that are open when fluid injection is stopped and the well is returned to production.

Gases that may be injected in conjunction with the treating agent may include nitrogen, carbon dioxide, or oxygen, or mixtures thereof. The gases may also include low molecular weight hydrocarbon gases such as methane, ethane and propane, or volatile organic compounds.

Although the process of the invention has particular applicability to improving product recovery from a production well that operates to recover products from subterranean coal deposits, the invention is not limited thereto. Moreover, although in general, methane is a desired gaseous product, the present invention is not limited to wells that recover methane from carbonaceous deposits such as coal. A coal deposit may be lignite or brown coal, subbituminous coal, bituminous coal, semibituminous coal, semianthracite or anthracite coal.

Numerous modifications and variations of the invention are possible in light of the above teachings and, therefore, within the scope of the claims, the invention may be practiced otherwise than as set forth with respect to specifically described embodiments thereof.

What is claimed is:

1. A process for improving recovery of product from a subterranean carbonaceous deposit wherein there has been a reduction in product recovery from a production well for said carbonaceous deposit, comprising treating the deposit with a liquid that contains at least one of (i) an oxoacid ester of phosphorous esterified with at least one alkanol or (ii) a thioacid ester of phosphorous esterified with at least one alkanol.

2. The process of claim 1 wherein the product comprises methane.

3. The process of claim 2 wherein the deposit is a coal deposit.

4. The process of claim 3 wherein the liquid contains an oxoacid ester of phosphorous.

5. The process of claim 4 wherein the at least one alkanol is selected for the group consisting of methanol, ethanol, ethylene glycol, propylene glycol, glycerol, pentaerythritol, trimethylol alkane, and 2,2-dimethylpropylene-1,3-diol.

6. The process of claim 5 wherein the deposit is treated by introducing the liquid into the production well.

7. The process of claim 6 wherein the liquid further contains water.

8. The process of claim 7 wherein the liquid is introduced into an injection well associated with the production well.

9. The process of claim 8 wherein said liquid is injected at a pressure less than the deposit fracturing pressure.

10. The process of claim 8 wherein said liquid is injected at a pressure greater than or equal to the deposit fracturing pressure.

11. The process of claim 7 wherein said liquid is injected into said deposit, and after said liquid is injected said well is shut in for a period of time, which may range from minutes to more than one month, and said well is then opened to flow from said deposit.

12. The process of claim 7 wherein said liquid is heated prior to or during treating of the deposit.

13. The process of claim 7 wherein a device capable of generating sound waves is placed into the production well and utilized to improve the reactivity of the liquid with the deposit.

14. The process of claim 7 wherein said liquid further includes at least one of a compound to reduce surface tension, increase surface tension, prevent precipitation of solids, promote desorption of methane from the deposit or reduce friction pressure drop within the formation and into the production well.

15. The process of claim 7 wherein said treating includes treating with a gas that is at least one of nitrogen, oxygen, carbon dioxide, low molecular weight hydrocarbon gases, volatile organic compound, and said gas is introduced or injected along with prior to, or after said liquid is injected into the deposit.

16. The process of claim 7 wherein said treating includes use of a proppant, introduced or injected along with said liquid.

17. The process of claim 7 wherein the production well connecting the surface to the deposit is configured as a vertical well, angled well, horizontal well or well having one or more penetrations or entries accessing one or more individual deposits.

18. The process of claim 7 wherein the treating with the liquid may be preceded by or followed by a hydraulic stimulation treatment, above or below the deposit fracturing pressure.

19. The process of claim 7 wherein the liquid is introduced in volumes to unplug flow passages in the deposit to increase fluid flow through the deposit.

20. The process of claim 1, wherein the deposit treated is comprised of components selected from the group consisting of: coal, lignite, peat, carbonaceous shale, kerogen, oil, oil shale, tar sands, and bitumen.

* * * * *